Aug. 25, 1959
L. C. LUDBROOK
2,901,681
REMOTE ANGULAR POSITION CONTROL SYSTEM
Filed April 21, 1958
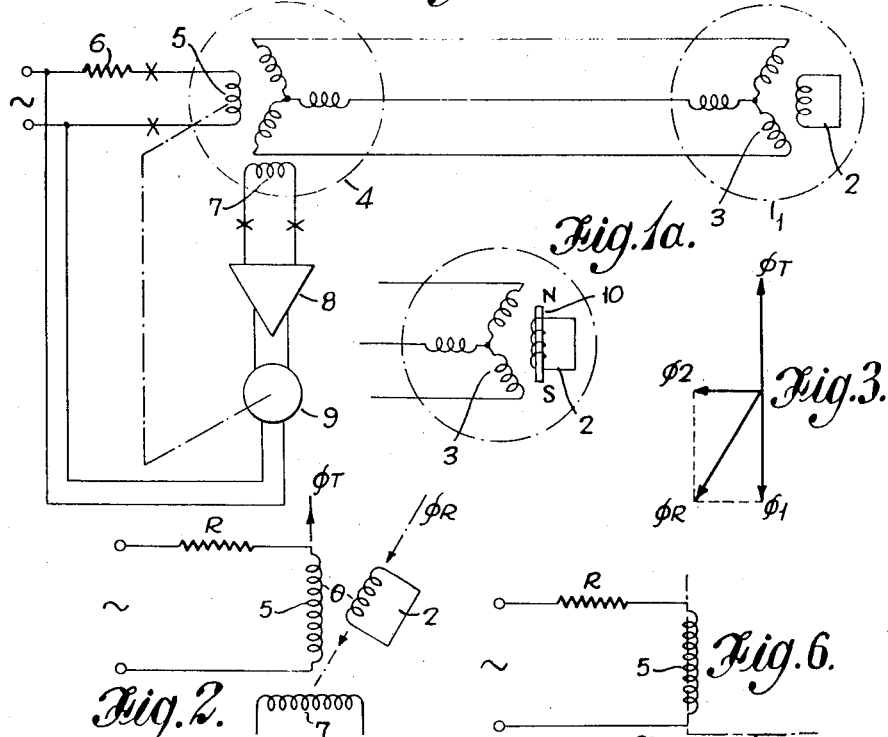
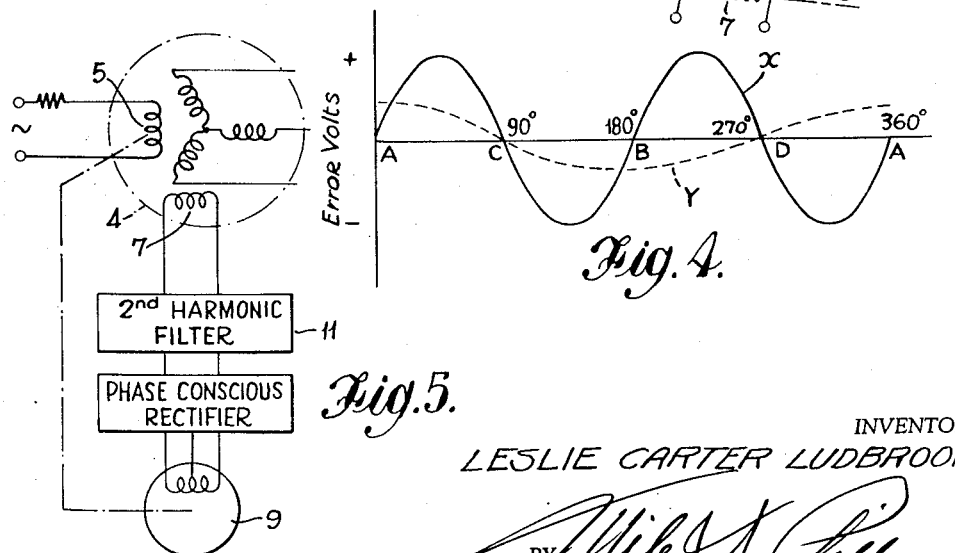
INVENTOR
LESLIE CARTER LUDBROOK
BY
ATTORNEY

United States Patent Office 2,901,681
Patented Aug. 25, 1959

2,901,681

REMOTE ANGULAR POSITION CONTROL SYSTEM

Leslie Carter Ludbrook, Cawston, near Rugby, England, assignor to The British Thomson-Houston Company Limited, London, England, a British company Application April 21, 1958, Serial No. 729,862

4 Claims. (Cl. 318—30)

This invention relates to remote angular position control systems of the kind using selsyn type dynamo-electric machines.

It is well-known in such systems to interconnect the polyphase stator windings of the transmitting and receiving machines and to supply single-phase A.C. to the rotor winding of one of the machines, usually the transmitting machine, so that a single-phase error voltage is developed in the rotor winding of the other machine when the rotors of the machines are not in angular positional alignment with one another, the single-phase error voltage being utilised, usually after suitable amplification, to control an electric motor connected to the other machine whereby to rotate its rotor into angular positional alignment with the rotor of the transmitter. The error voltage then disappears and the motor ceases to be energised. The power required to drive the receiver into positional alignment with the transmitter is thus supplied by the motor which is in turn energised from an external source. In such an arrangement, both the transmitting and receiving machines require slip rings in order to convey the single-phase supply and error voltages to and from the machine respectively. Circumstances, however, arise where the use of slip rings is objectionable and it is the object of the present invention to provide a modification of a system of the character above referred to which avoids the need for slip rings on one of the machines.

According to the invention a remote angular position control system comprises a selsyn transmitter having its single-phase rotor winding short-circuited, and a selsyn receiver, the rotor of which is provided with two single-phase windings in space quadrature, one of the rotor windings being connected through resistance to a source of single-phase supply, while the other, or quadrature, winding is connected through amplifying means to energise an electric motor coupled with the receiver whereby to rotate the receiver into angular positional alignment with the transmitter in response to single-phase voltages induced in the quadrature winding.

The voltage induced in the quadrature winding on the receiver is dependent upon the degree of coupling provided by the stator windings of the transmitter and receiver and this in turn depends on the relative angular position of the rotor of the transmitter and that of the receiver. The voltage induced in the quadrature winding is preferably used after amplification, to energise one phase of a two-phase motor which is coupled to the rotor of the receiver, the other phase winding of the motor being connected to the A.C. supply, so that the motor is effective to drive the receiver into an angular position in which the winding on the receiver rotor is either in line with or at right angles to, the short-circuited winding on the transmitter. Alternatively, the amplifying means may incorporate a phase-conscious rectifier, so that the output from the amplifier is a direct current of reversible polarity, which is used to energise a reversible D.C. motor coupled to the receiver.

In order to reduce the possibility of ambiguity in the position into which the receiver is driven, we may include in the rotor of the transmitter on the axis of the short-circuited winding, a permanent magnet which serves to polarise the magnetic circuit beyond the knee of the magnetisation curve, and to produce a distorted flux wave, resulting in the introduction of a second harmonic of the fundamental excitation frequency into the voltage induced in the pick-up coil in the receiver.

An arrangement in accordance with the invention is shown in the accompanying drawings. In these drawings—

Fig. 1 shows the arrangement diagrammatically of the transmitter and receiver machines;

Fig. 1a shows a modification of the transmitter in a system such as that shown in Fig. 1 utilizing a permanent magnet in connection with the short circuit rotar winding 2;

Fig. 2 is an explanatory diagram of the phase relations between the windings on the transmitter;

Fig. 3 is a vector diagram of the fluxes in the windings of the rotor of the receiver;

Fig. 4 shows the variation of the voltage present in the transmitter/rotor winding with angular positional misalignment;

Fig. 5 diagrammatically illustrates a receiver for use in a system such as that shown in Fig. 1 and provided with a second harmonic filter and phase conscious rectifier; and Fig. 6 diagrammatically illustrates a modification of the arrangement shown in Fig. 2 wherein the pick-up windings are displaced from their true quadrature.

Referring to the drawings, Fig. 1 shows a selsyn transmitter at 1, its shorted rotor winding at 2, and its stator winding at 3. The selsyn receiver is shown at 4, its first rotor winding at 5 being connected to an A.C. supply through a high resistance 6, and its second, or quadrature rotor winding 7 being connected to an amplifier 8, the output of which is fed to a servo motor 9, which is mechanically coupled to the rotor of the receiver. The value of resistance 6 should be high compared with reactance of said winding, so that the flux produced by the winding is substantially in phase with the A.C. supply, and to limit the current supplied to the receiver selsyn.

As the rotor winding 5 is fed through a high resistance 6, the current is limited to a safe value, even when the short-circuited transmitter winding is in the position shown (or the equivalent 180° away) at which it has maximum induced current.

The resolving and recombining action of the two stator windings means that, in effect, the short-circuited rotor on the transmitter introduces variable couplings between the excited and the pick-up windings 5 and 7 on the receiver rotor.

Fig. 2 shows a composite representation of the two receiver windings 5 and 7, and the short-circuited transmitter winding 2. Winding 5 is energised and produces an excitation flux $\phi T$, which induces a current in the short-circuited winding 2. When the angle $\theta$ is zero or 180°, maximum current is induced in the short-circuited winding, and hence it provides the maximum value of flux $\phi R$. In this position, however, this flux cuts the quadrature winding 7 at right angles, and so induces zero error volts in it.

If angle $\theta$ is 90° or 270° there is no current in the short-circuited rotor winding, hence flux $\phi R$ is zero and again zero volts are induced in the pick-up winding 7. At intermediate values of $\theta$ there is a current induced in the short-circuited rotor winding 2, and the flux $\phi R$ has two components $\phi 1$ opposing the exciting flux $\phi T$, and $\phi 2$ linking the pick-up coil and inducing an error voltage. Figure 3 shows a flux vector diagram when the windings are disposed as shown in Fig. 2, and Fig. 4 shows in curve X the variation of error voltage with angular displacement between the transmitter coil 2 and the receiver coil 5.

If the resistor in series with the excited coil is so high that the exciting current and the flux $\phi T$ are in phase with the A.C. supply voltage, then the induced error volts are in time quadrature with the A.C. supply. After amplification they can therefore be applied to one phase of a conventional two phase servo motor, the other phase being directly connected to the A.C. supply.

Polarities may be chosen so that A and B on Fig. 4 are the stable balance points for the servo, C and D being metastable points, or vice-versa. This system therefore has the same 180° ambiguity at present associated with any other short-circuited rotor power selsyn scheme, but it enables physically small selsyns to be used with a servo amplifier system to develop large torques, and furthermore, it limits the circulating current in the system to a very low value.

In order to reduce the possibility of such ambiguity occurring, the transmitter may be polarised by means of a permanent magnet 10, shown in Fig. 1a. The effect of this is to magnetise the magnetic circuit of the transmitter beyond the knee of the magnetising curve, thus producing a distorted flux wave therein. A resultant second harmonic of the fundamental frequency is thereby induced into the pick-up winding 7 of the receiver.

The second harmonic component depends on the flow of fundamental frequency current around the permanent magnet in the short-circuited rotor winding of the transmitter, and hence is zero at the two positions where the latter is at right-angles to the excited rotor winding of the receiver (say at positions 90° and 270°) and rises to a maximum at the two in-line positions (say 0° and 180°) as indicated by the dotted line Y in Fig. 4. The phase of the second harmonic reverses relative to the A.C. excitation as the direction of the permanent magnet is reversed, so that a phase-conscious rectifier can be arranged to give positive D.C. output in the region of position 0°, negative in the region of position 180°. Thus, as shown in Fig. 5, the output from winding 7 may be passed through a second harmonic filter 11 and a phase conscious rectifier 12 and be utilized to operate a servo motor 9 of the reversible D.C. type.

By appropriate phasing of the reference A.C. to the two phase servo motor or equivalent phase-conscious rectifier, positions 90° and 270° are made the metastable balance points for the complete servo system responding to fundamental frequency error signal; hence servo balance on the fundamental frequency error signal can only occur at positions 0° and 180°, and the supplementary signal from the second harmonic can be used in various ways to give a warning or to inhibit balance at the undesired one of these two positions.

The second harmonic voltage appears at the terminals of the excited rotor winding on the receiver superimposed on the fundamental frequency supply voltage, and can be separated out by known types of filter or cancellation circuit.

As a cheaper alternative, the pick-up winding on the receiver rotor may be deliberately displaced say 5° from true quadrature, as shown in Fig. 6, and the second harmonic voltage taken from its terminals. The excited winding now induces a fundamental voltage directly into the pick-up winding which is cancelled by displacement of the short-circuited winding from the 0° or 180° position. However, the in-line short-circuited winding is still carrying almost its maximum induced current, so inducing the second harmonic into the pick-up winding. In effect, the selsyn supplied its own fundamental cancelling signal, thus saving the cost of a separate filter.

The system is particularly suitable for applications in which the space occupied by the transmitter unit is required to be small, and in which the use of sliprings or rubbing contacts on the transmitter is not permitted.

Such an application would be for the control rod actuating mechanism for nuclear power stations, where a remote indication of the angular position of a shaft in the reactor pressure vessel is required.

What I claim is:

1. A remote angular position control system comprising a selsyn transmitter having its single-phase rotor winding short-circuited, and a selsyn receiver, the rotor of which is provided with two single-phase windings in space quadrature, one of the rotor windings being connected through resistance to a source of single-phase supply, while the other, or quadrature, winding is connected through amplifying means to energise an electric motor coupled with the receiver whereby to rotate the receiver into angular positional alignment with the transmitter in response to single-phase voltages induced in the quadrature winding.

2. A remote angular position control system as claimed in claim 1, in which the motor coupled with the receiver is a two-phase motor, one phase winding of which is connected to the single-phase supply used to energise the primary winding of the selsyn receiver, and the other of which is energised from the output of the amplifying means.

3. A remote angular position control system as claimed in claim 1, in which the motor coupled to the receiver is a D.C. motor energised with reversible direct current obtained from the output of the amplifying means by including a phase-conscious rectifier therein.

4. A remote angular position control system as claimed in claim 1 in which the transmitter is polarised by means of a permanent magnet located on the axis of the short-circuited winding thereon to such an extent as to cause the magnetisation of the magnetic circuit of the transmitter to be taken beyond the knee of the magnetisation curve.

No references cited.